United States Patent [19]
Dixon

[11] Patent Number: 5,070,505
[45] Date of Patent: Dec. 3, 1991

[54] SELF-DOUBLING MICRO-LASER

[75] Inventor: George J. Dixon, Melbourne, Fla.

[73] Assignee: Amoco Corporation, Chicago, Ill.

[21] Appl. No.: 638,098

[22] Filed: Jan. 7, 1991

Related U.S. Application Data

[63] Continuation-in-part of Ser. No. 516,459, Apr. 30, 1990.

[51] Int. Cl.$^5$ .................. H01S 3/10; H03F 7/00
[52] U.S. Cl. ........................... 372/22; 372/99; 372/108; 359/326; 359/328
[58] Field of Search ............ 372/21, 22, 99, 108; 307/425, 427, 428

[56] References Cited

U.S. PATENT DOCUMENTS

| | | | |
|---|---|---|---|
| 4,739,507 | 4/1988 | Byer et al. ............... | 372/22 |
| 4,791,631 | 12/1988 | Baumert et al. ........... | 372/22 |
| 4,797,893 | 1/1989 | Dixon ....................... | 372/66 |
| 4,910,740 | 3/1990 | Oka .......................... | 372/22 |
| 4,951,294 | 8/1990 | Basu ......................... | 372/75 |
| 4,953,166 | 8/1990 | Mooradian ................. | 372/21 |

Primary Examiner—William L. Sikes
Assistant Examiner—Galen J. Hansen
Attorney, Agent, or Firm—James A. Gabala; William H. Magidson; Ralph C. Medhurst

[57] ABSTRACT

A micro-laser is formed from a substantially thin etalon of a self-doubling crystal which has two opposite faces and which is positioned, relative to a close coupled and diode pumped source of optical radiation, for resonantly enhanced phase-matched harmonic generation along an axis of propagation which is substantially perpendicular to the two faces of the etalon.

34 Claims, 1 Drawing Sheet

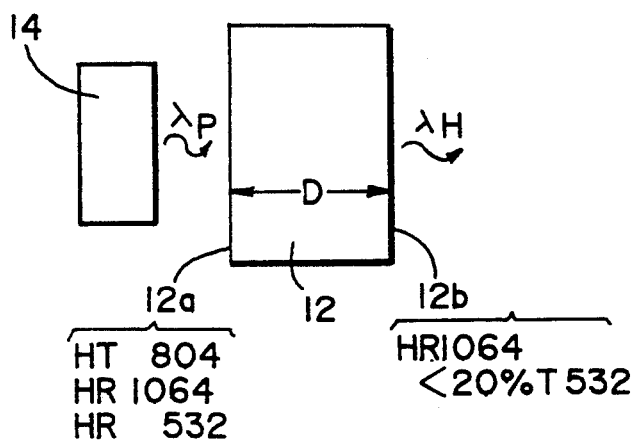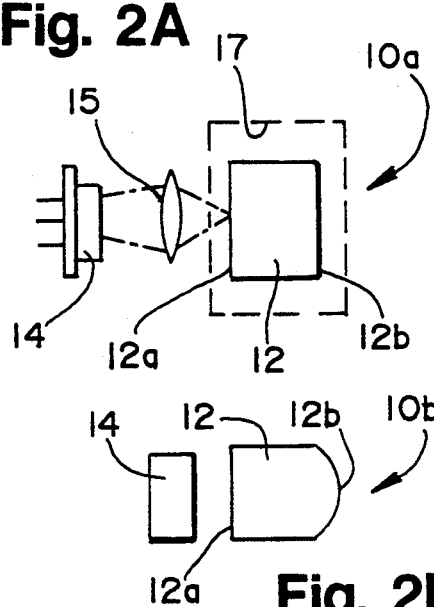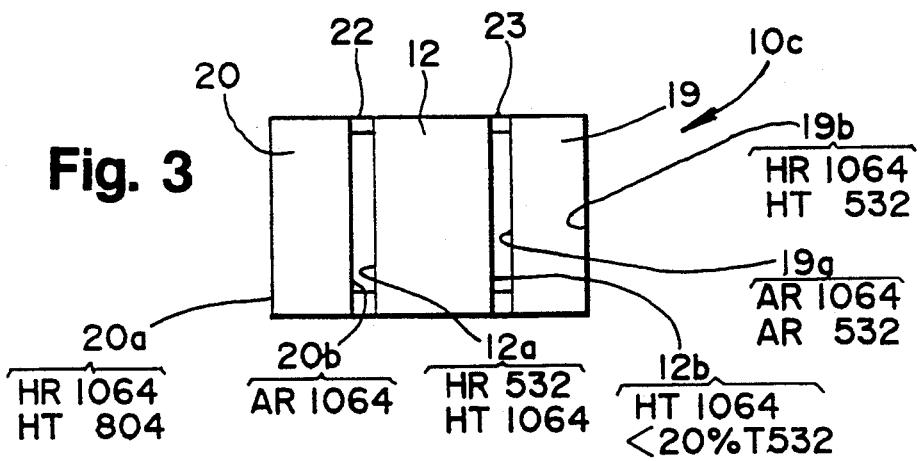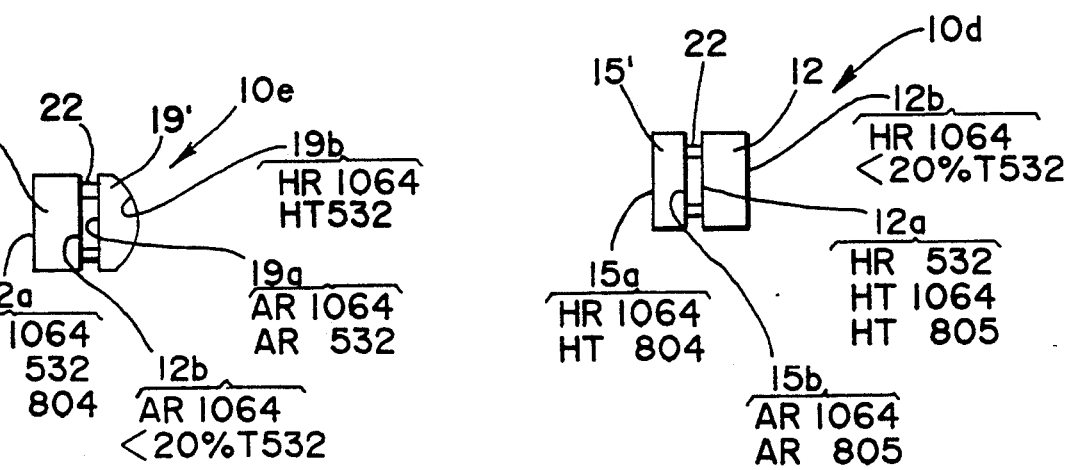

SELF-DOUBLING MICRO-LASER

CROSS REFERENCE TO RELATED APPLICATION

This application is a continuation-in-part of a patent application which was entitled "Internally-Doubled, Composite-Cavity Laser," which was filed on Apr. 30, 1990, under Ser. No. 07/516,459.

TECHNICAL FIELD

This invention relates to the general subject of lasers and, in particular, to solid-state, diode-pumped harmonic generators.

BACKGROUND OF THE INVENTION

There has been tremendous progress in the past several years in the field of diode-pumped frequency-doubled solid state lasers. A variety of applications in optical data storage, reprographics and medical instrumentation have fueled the rapid development of these devices. There have been major advances in both the efficiency of nonlinear conversion as well as the elimination of the mode-competition instability associated with efficient harmonic conversion.

One particularly useful diode-pumped solid-state laser is a micro-laser. A micro-laser is a monolithic or composite cavity, diode-pumped solid-state laser having relatively short cavity and having cavity forming reflective surfaces on opposite ends of the lasant material or an adjacent material.

U.S. Pat. No. 4,847,851 to Dixon discloses a compact, diode-pumped, solid-state laser wherein the diode pump is butt-coupled or close-coupled to a laser gain material which absorbs 63% of the optical pumping radiation within a pathlength of less than 500μ. Optical lenses were not needed for coupling.

J. J. Zayhowski and A. Mooradian, "Single-frequency Microchip Nd Lases," *Optics Letters*, Vol. 14, No. 1, pp. 24–26 (Jan. 1, 1989), have reported the construction of single-frequency microchip lasers which use a miniature, monolithic, flat-flat, solid-state cavity (e.g., 730 micron long cavity) whose mode spacing is greater than the gain bandwidth of the gain medium; and which are longitudinally pumped with the close-coupled, unfocused output of a laser diode. Mooradian has also disclosed in U.S. Pat. No. 4,860,304 a micro-laser employing a gain medium made from a stoichiometric laser material, such as Nd pentaphosphate, and having a cavity length in the range of 10 to 100 μm.

Frequency doubling or second harmonic generation (SHG) uses a non-linear optical crystal to produce laser light having a wavelength of about one half of a predetermined fundamental wavelength. One common or conventional SHG method is intracavity doubling using KTP (i.e., potassium-titanyl-phosphate or $KTiOPO_4$) as a nonlinear crystal. Up to 180 mW of 532 nm radiation have been obtained in this way with a longitudinally disposed, diode laser pumped Nd:YAG laser. Conventional SHG methods require either additional (i.e., lossy) optical elements in the laser cavity or an external (i.e., frequency tunable) resonator. The conversion of optical radiation at one frequency into optical radiation of another frequency by interaction with a nonlinear optical material within an optical cavity is disclosed in U.S. Pat. No. 4,933,947 to D. W. Anthon and D. L. Sipes and entitled "Frequency Conversion of Optical Radiation". A diode pumped laser having a harmonic generator is disclosed by Robert Byer, G. J. Dixon and T. J. Kane in U.S. Pat. No. 4,739,507 and in an article by Byer, "Diode Laser-Pumped Solid-State Lasers," *Science*, Vol. 239, Feb. 12, 1988, page 745.

One simple method for SHG of a diode pumped laser uses self-doubling laser materials, like $Nd:MgO:LiNbO_3$ or NMLN [See T. Y. Fan et al, *J. Opt. So. Am. (B)*, 3, 140 (1980)], or lithium niobate ($LiNbO_3$) doped with a rare earth, such as thulium, or the substituted stoichiometric neodymium compound, neodymium yttrium aluminum borate (NYAB) or Nd:YAB or $Nd_xY_{1-x}Al_3(BO_3)_4$. Dorozhkin et al, *Sov. Phys. Lett.* 7, 555 (1981) and J. T. Lin, *Lasers and Optronics*, 8 (7), 61 (1989). NYAB is self-doubling for Type-I harmonic generation. Other self-doubling materials include $Nd:La B Ge O_4$ and Cr:KTP.

Self-frequency doubling using NYAB pumped with flashlamps has been reported. V. G. Dimitriev et al, "Simultaneous Emission at the Fundamental Frequency and the Second Harmonic in an Active Nonlinear Medium: Neodymium Doped Lithium Metaniobate," *Soviet Technical Physics Letters*, Vol. 5 (11), page 590 (1979). Red light at 660 nm was obtained from 1320 nm optical pumping. The first dye-laser pumped NYAB green laser was reported by Lu in 1986. Baosheng Lu et al, *Chinese Physics Letters*, 3:413.

The characteristics of NYAB as a diode pumped laser material have been studied. Wang and Stone, *Topical Meeting on Advanced Lasers*, Session TuB4, Mar. 6, 1990. Wang and Stone used a (3×3×4) mm crystal of NYAB which was pumped by a GaAlAs laser diode array having 500 mW of output power, a 200 mm collimating lens and a beam conditioning lens. An external output coupling mirror, located 7.5 cm from the front facet of the crystal, was also used.

Recently, diode laser pumped CW operation of NYAB has been reported. Schutz and Wallenstein, "Self-frequency doubling Nd:YAB laser pumped by a diode laser", May 23, 1990, paper CWC4, *CLEO*-90, Anaheim Calif. In that device, the laser resonator contained only a coated NYAB crystal and an output coupler. With a 1 Watt diode laser as a pump source, a 25 mm long laser resonator produced 10 mW of 532 nm radiation. With optimized output coupling for the fundamental, 180 mW was produced at a wavelength of 1.064 μm. More recently it has been reported that a U.S. patent has been filed for an apparatus which was invented by J. T. Lin and B. Lu and which uses an optical fiber to couple the output from a 1-W diode laser into a (3×3×3) mm NYAB plano-convex crystal to produce 80 mW green output. J. T. Lin "Doubled Jeopardy: The Blue-Green Race's New Players", *Lasers and Optronics*, December 1990, page 34. Dual high reflectors were used on one side of the crystal to prevent a loss of harmonic output back towards the pump source. In addition, the opposite side was coated for high transmission at the wavelength of the harmonic. Moreover, no attempt was made to control the coating phase which is critical for an enhancement of the SHG output.

A U.S. patent application, filed on Apr. 30, 1990, under Ser. No. 07/516,459, which is entitled "Internally-Doubled, Composite-Cavity Laser" and which is assigned to the assignee of the present invention, describes a composite cavity micro-laser which, in one embodiment, comprises a gain medium, a thin etalon of a nonlinear crystal and a waveplate for polarization control. The effective nonlinearity of the etalon was increased substantially by coating its surfaces to form a harmonic sub-resonator. In that micro-laser, the nonlinear crystal and gain medium were separate elements which were located adjacent to each other. Further size reductions might be possible if the gain medium were separate elements which were located adjacent to each other. Further size reductions might be possible if the gain medium and the nonlinear crystal were combined by using self-frequency doubling (SFD) crystal, such as NYAB. However, others have suggested that resonant enhancement of second harmonic generation in NYAB should be impossible because of the high absorption of 522 nm. Schutz, "Miniature Self-Frequency-Doubling CW Nd:YAB Laser Pumped by a Diode-Laser," *Optics Communications*, Vol. 77(2.3), June 15, 1990, page 221.

Thus, although the practicality of self-doubling laser materials is recognized, a small, close-coupled, diode-pumped, solid-state, self-doubling micro-laser has yet to be realized. Moreover, there is reason to believe that satisfactory performance may not be possible. Further simplification and miniaturization is needed to make them amenable to mass production with a consequential reduction in unit cost. The art would find much utility in a self-doubling micro-laser which could be manufactured at low cost and which lends itself to mass production.

SUMMARY OF THE INVENTION

One fundamental object of the invention is to provide a miniaturized, self-doubling resonantly enhanced laser.

Another object of the invention is to provide a diode-pumped laser utilizing a self-doubling crystal having polished and coated faces which form a resonator for the crystal.

Yet another object of the invention is to provide a laser comprising a sub-millimeter thickness of a self-doubling crystal.

Still another object of the present invention is to provide a resonantly enhanced micro-laser comprising neodymium yttrium aluminum borate.

Yet another object of the present invention is to extend the concepts of my U.S. patent application entitled "Internally-Doubled, Composite-Cavity Laser" to include gain media which are also electro-optic.

A final object of the present invention is to disclose a means by which usable and efficient harmonic power is obtained from a single-crystal, monolithic micro-laser.

Specifically, disclosure is made of a laser comprising: a self-doubling crystal which has two opposite light reflecting faces and which is positioned to receive optical pumping radiation from laser diode source means; and resonance means, associated with said faces, for resonantly enhanced phase-matched generation of laser light at a fundamental wavelength and laser light at a harmonic of said fundamental wavelength. Preferably the source is a laser diode array which is close-coupled to the self-doubling crystal and the self-doubling crystal is a thin flat platelet having two opposite coated faces for phase-matched harmonic resonance.

In one particular embodiment of the invention, the laser comprises an etalon of NYAB having a thickness between 0.2 and 0.5 mm and having two opposite substantially flat faces of which one face is coated for high transmission at 804 nm and for high reflection at 532 nm and 1064 nm and of which the other face is coated for high reflection at 1064 nm and for 1% to 20% transmission at 532 nm.

Some of the advantages of the disclosed laser design include its simplicity, the absence of pumping optics, and its small size. In addition, it lends itself to mass production and is inherently a simpler and lower cost design. Numerous other advantages and features of the present invention will become readily apparent from the following detailed description of the invention, the embodiment described therein, from the claims, and from the accompanying drawings.

BRIEF DESCRIPTION OF THE DRAWINGS

FIG. 1 is a schematic line diagram, of a monolithic, self-doubling micro-laser that is the subject of the present invention;

FIGS. 2A and 2B illustrate two alternative embodiments of the laser of FIG. 1;

FIG. 3 illustrates a three piece composite cavity cube embodiment of the present invention;

FIG. 4 illustrates a two-piece stable resonator embodiment of the present invention; and FIG. 5 depicts a two-piece resonator design having a convex piece for phase control and stabilization.

DETAILED DESCRIPTION OF THE INVENTION

While this invention is susceptible of embodiment in many different forms, there is shown in the drawings, and will herein be described in detail, several specific embodiments of the invention. It should be understood, however, that the present disclosure is to be considered an exemplification of the principles of the invention and is not intended to limit the invention to the specific embodiments illustrated.

Laser radiation produced by a lasant material in an optical cavity can be either single longitudinal mode in character or it can be comprised of two or more longitudinal mode structure is expressly specified, reference herein to laser radiation as having a specific frequency will be understood to include all of the longitudinal modes of substantially the same frequency which are generated by the lasant material and supported within the optical cavity.

Turning to FIG. 1, the laser 10 comprises a gain material 12 in the form of a platelet or a thin etalon which is made from a self-doubling material and which is optically pumped by a source 14, preferably a close coupled source having an infrared (IR) output. Suitable optical pumping means or sources include, but are not limited to, laser diodes, light-emitting diodes (including superluminescent diodes and superluminescent diode arrays) and laser diode arrays, together with any ancillary packaging or structures. For the purposes hereof, the term "optical pumping means" includes any heat sink, thermoelectric cooler or packaging associated with a laser diode, a light-emitting diode and an array of laser diodes or light-emitting diodes. For example, such devices are commonly attached to a heat resistant and conductive heat sink and are packaged in a metal housing. For efficient operation, the pumping radiation emitted by the optical pumping means or source 14 is desirably matched with a suitable absorption band of the lasant material.

Although the invention is not be be so limited, a highly suitable optical pumping source 14 consists of at least one gallium aluminum arsenide GaAlAs laser diode which emits light having a wavelength of about 804 nm, and which is attached to a heat sink. The heat sink can be passive in character. However, the heat sink can also comprise a thermoelectric cooler or other temperature regulation means to help maintain a laser diode source 14 at a constant temperature and thereby ensure optimal operation of a laser diode at a constant wavelength. It will be appreciated, of course, that during operation a laser diode optical pumping means will be attached to a suitable power supply. Electrical leads, the heat sink and any controls to or from the laser diode which are directed to the associated power supply, are not illustrated for simplicity.

Conventional light-emitting diodes and laser diodes are available which, as a function of composition, produce output radiation having a wavelength over the range from about 630 nm to about 1600 nm, and any such device producing optical pumping radiation of a wavelength effective to pump a lasant material can be used as a source 14 in the practice of this invention. For example, the wavelength of the output radiation from a GaInP based device can be varied from about 630 to about 700 nm by variation of the device composition. Similarly, the wavelength of the output radiation from a GaAlAs based device can be varied from about 750 to about 900 nm by variation of the device composition. InGaAsP based devices can be used to provide radiation in the wavelength range from about 1000 to about 1600 nm.

Returning to FIG. 1, the gain material 12, in one preferred embodiment, is made from an etalon of NYAB and has two opposite, flat, parallel polished faces 12a and 12b. It is oriented to have the faces 12a and 12b perpendicular to the propagation axis for phase-matched generation at the wavelength at which the self-doubling material lases (typically 1064 nm or 1340 nm for NYAB) and at its harmonic. NYAB may be obtained from a variety of sources (e.g., CSK Co. Ltd. of Culver City, Calif.; JTT Company of Winter Springs, Fl.; and Hoya Optics Inc. of Fremont, Calif.). Preferably, the round trip absorption at the harmonic wavelength is less than about 25 percent. In general, the longer the distance "D" between the reflective faces 12a and 12b of the NYAB, the lower the concentration of neodymium.

Preferably, the output facet the of semiconductor light source 14 is placed in butt-coupled relationship to input face 12a of the gain material or etalon 12 without the use of a focusing means or lens. As used herein, "butt-coupled" is defined to mean a coupling which is sufficiently close such that a divergent beam of optical pumping radiation emanating from semiconductor light source 14 will optically pump a mode volume within a lasant material with a sufficiently small transverse cross-sectional area so as to support essentially only single transverse mode laser operation (i.e., $TEM_{00}$ mode operation) in the etalon 12. Preferably, optical pumping radiation is delivered to the lasant etalon 12 in a direction which is substantially along a longitudinal optical path. The result is a miniature, all solid-state device having a visible output at a power level in excess of 1 mW.

Alternatively, a focusing means or an imaging means can be used to image a laser diode array into the self-doubling gain material 12. This embodiment 10a is illustrated in FIG. 2A. An Imaging means 15, such as a lens, serves to focus the output of a single stripe laser diode or diode array 14 into the input face 12a of a cube 12 of NYAB. This focusing results in high pumping intensity and an associated high photon to photon conversion efficiency in the lasant material 12. The focusing means can comprise any conventional device such as a gradient index (i.e., GRIN) lens, a ball lens, an aspheric lens or a combination of lenses. Some form of temperature control or tuning 17 may be required to optimize the harmonic conversion in the etalon 12 and control the dispersion of the coatings on the two faces 12a and 12b.

In FIG. 1, the input face 12a of the etalon 12, (i.e., the face which is closest to the source 14) is coated with a dielectric for high reflection (HR) at 1064 nm and 532 nm. The opposite face 12b is coated with a dielectric for high reflection at 1064 nm (i.e., the fundamental wavelength) and for 1% to 20% transmission at 532 nm (i.e., the harmonic wavelength) so as to form an output coupler. Typical 532 nm reflectivities for a 0.5 mm thick crystal of NYAB with 6% Nd dopant concentration are HR on the pump or input face 12a and 1% to 20% on the output face 12b. Due to the high reflectivity of the coatings on the polished faces 12a and 12b of the etalon 12, the laser 10 has a relatively low threshold of operation.

The input face 12a of the etalon 12 is also coated for high transmission (HT) at the pumping wavelength (e.g., about 800 nm) of the source 14 to allow the pumping radiation to reach the self-doubling lasant material or crystal which forms the etalon 12.

Preferably, the output coupler (i.e., output mirror face 12b) is impedance-matched to the harmonic absorption in the self-doubling gain material 12. This is not negligible in NYAB and is estimated to be less than twenty percent for etalons 12 which are 0.2 mm to 0.5 mm in length. Harmonic resonance increases the "effective nonlinearity" of the gain crystal 12 by the reciprocal square root of the harmonic resonator's quality factor Q. This has the effect of substantially increasing the harmonic conversion to usable output values and greatly improving its output for a given overall length or size.

For successful implementation of this laser 10, one should endeavor to achieve accurate control of the phases of the harmonic and infrared fields at the two reflectors or mirrors which are formed on the two faces 12a and 12b. Dielectric coatings have been used to achieve this result. For maximum harmonic output, the harmonic field should remain phased with the fundamental field after reflection. Such coatings are possible to design and obtain; although, by today's standards, they tend to be somewhat more expensive and difficult to produce than conventional coatings in which the phase is not controlled. The preferred embodiment of this invention is based on a thin etalon of NYAB with face coatings to create both a highly reflective resonator for the infrared laser and an impedance-matched resonator at the second harmonic to increase the visible light output to usable values.

EXAMPLE

One prototype micro-laser 10 employing the principles of the present invention used a NYAB cube etalon 12 having dimensions of 500 μm by 3 mm by 3 mm. Two opposite faces were coated to be HR at 1064 nm, HR at 531 nm on the input face 12a and 80% R at 531 nm on the output face 12b. The etalon 12 was pumped by a Ti:sapphire laser source running at 804 nm. For 490 mW input, a 18 mW output at 531 nm was observed in a $TEM_{00}$ mode. Although three modes were running in the IR range, the SHG output was single frequency and the noise was very low. Adjacent longitudinal modes (at 4 Å spacing) appeared to be orthogonally polarized; apparently only one infrared mode is within the narrow acceptance bandwidth and has the correct polarization for Type-1 phase matching in NYAB. The phase matching was fine tuned with temperature. A FWHM of 3° C. for the SHG output was observed, as opposed to 0.2° C. for the three-component internally doubled cube laser disclosed in U.S. Pat. application Ser. No. 07/516,459. A complete absence of mode-competition noise was noted in the 10 to 500 kHz region, as the single-frequency output would imply.

Alternatively, the self-doubling lasant material 12 can be in the form of a stable resonator instead of a plane parallel cube or etalon. A stable resonator would use a gain material having at least one curved face. Although this embodiment of the harmonic resonant self-doubling laser is, by today's standards, more difficult to fabricate in quantity than the planar design, it may lead to improved performance in some cases.

FIG. 2B illustrates an example of a monolithic, stable-resonator self-doubling laser 10b with harmonic resonance. The only difference between this embodiment and that of FIG. 1 is the fact that at least one face 12b of the crystal 12 is polished convex to form a stable resonator. The coatings are identical to those described for the plane parallel cube cavity. This structure can be pumped by close-coupling it to a diode pump source 14 or by focusing it with a lens, as illustrated in FIG. 2A.

In addition to the monolithic designs illustrated in FIGS. 1, 2A and 2B, multi-component or composite designs should be considered. Examples are shown in FIGS. 3, 4 and 5. In these embodiments a second (or third) element is inserted into the cavity. This element can either be optically contacted to the self-doubling gain crystal 12 or spaced from it. One might prefer to use a two-piece structure in a stable cavity laser (see FIG. 2B) to permit the curved mirror 12b to be fabricated separately from the NYAB gain element 12. The additional element might also be used to control the relative phases of the harmonic and fundamental in the cavity.

A three component cube design 10c is shown in FIG. 3. The two additional elements 19 and 20 can be used to control the relative phases of the fundamental and harmonic and/or stabilize the cavity. The three component structure is the general case and one could simplify it to a two-piece structure by removing one of the two end-pieces 19 and 20.

In FIG. 3, the self-doubling crystal 12 has e-beam evaporated $Al_2O_3$ spacer "rails" 22 and 23 which are approximately 1 to 2 $\mu$m thick and which are located adjacent to the outside edges of the opposite surfaces 12a and 12b of the NYAB etalon. These rails separate the adjacent coated surfaces 20b, 12a, and 12b, 19a of the individual platelets 20, 12 and 19 from one another while maintaining the alignment tolerances of the composite micro-laser 10c.

The micro-laser 10c can be assembled by pressing the three platelets 20, 12 and 19 together after appropriate alignment. Parallelism of the two ends 20a and 19b of the composite cavity is guaranteed by the parallelism of the individual pieces and the fact that the rail spacers 22 and 23 preserve this parallelism while slightly separating the coated surfaces. The ease with which parallelism is maintained and the ease of assembly are two advantages that facilitate mass production of this embodiment of the invention.

In addition to phase control, it is also possible to use one or both of the end pieces 19 and 20 to create a stable cavity. There are at least two ways to do this. One is to make the outer surface of an element convex, thus creating a spherical mirror on the outer surface of the cavity. The other is to make the element from a plane parallel platelet of a gradient index material which will act like a spherical mirror. The advantage of the GRIN mirror element is the fact that a flat-flat component can be fabricated more easily than one with a curved surface.

In particular, FIG. 4 shows a two-component self-doubling laser 10d having a GRIN mirror 15' for phase control and stabilization of the cavity. FIG. 5 shows a two-component design 10c having a convex fused silica element 19'. These embodiments illustrate that the added element 15' or 19' can be added on either end of the gain medium 12. Any of these multi-component resonators 10c, 10d or 10e can be pumped by close coupling or by imaging the diode laser pump source into it with a lens (see FIG. 2A).

From the foregoing description, it will be observed that numerous variations, alternatives and modifications will be apparent to those skilled in the art. Accordingly, this description is to be construed as illustrative only and is for the purpose of teaching to those skilled in the art the manner of carrying out the invention. Various changes may be made, materials substituted and separate features of the invention may be utilized. For example, the precise geometric shape of lasant material 14 can be varied (e.g., the etalon 12 can be circular or rectangular in shape). If desired the etalon 12 can be end-pumped by an optical fiber. Furthermore, the etalon 12 can be formed from both organic and inorganic self-doubling lasant materials. In addition a quarter-wave plate, or similar device, can be located adjacent the output end of the laser to enhance a single-mode, single frequency output. Thus, it will be appreciated that various modifications, alternatives, variations, etc., may be made without departing from the spirit and scope of the invention as defined in the appended claims. It is, of course, intended to cover by the appended claims all such modifications involved within the scope of the claims.

I claim:

1. A laser, comprising:
   an active medium comprising a self doubling crystal which has two opposite faces;
   laser diode source means for pumping said crystal; and
   resonance means, associated with said faces, for resonantly enhancing and phase-matching laser light emitted by said crystal at a fundamental wavelength and at a harmonic of said fundamental wavelength, said resonance means having an output at said harmonic which is generally more reflective than transmissive.

2. The laser of claim 1, wherein said self-doubling crystal is pumped by laser diode source which is close coupled to said one of said faces; and wherein said resonance means comprises a coating on said one face for high reflection at said fundamental wavelength and at said harmonic wavelength and a coating on the opposite face for high reflection at said fundamental wavelength and for some transmission at said harmonic wavelength.

3. The laser of claim 2, wherein said self-doubling crystal comprises NYAB; and wherein said self-doubling crystal is in the form of an etalon having a thickness of one millimeter or less.

4. The laser of claim 1, wherein one of said faces is flat; and further including focusing means for imaging said laser diode source means into said one face of said self-doubling crystal.

5. The laser of claim 4, wherein said focusing means comprises a platelet characterized by a gradient index of refraction, said platelet having one face which is adjacent to said laser diode source means and having an opposite face which is adjacent to said one face of said self-doubling crystal.

6. The laser of claim 5, wherein said resonance means comprises a coating on said one face of said platelet for high reflection at said fundamental wavelength, and a coating on said one face of said self-doubling crystal for high reflection at said harmonic of said fundamental wavelength.

7. The laser of claim 5, further including spacer means for separating said opposite face of said platelet from said one face of said self-doubling crystal.

8. The laser of claim 1, wherein one of said faces is flat and the opposite face is curved and has a radius of curvature which is greater than the distance between said faces.

9. The laser of claim 8, wherein the distance between said faces is such that single pass absorption at said harmonic of said fundamental wavelength is on the order of twenty percent or less.

10. A micro-laser, comprising:
a thickness of a self-doubling gain medium which has two opposite face and which when optically pumped emits laser light at a fundamental wavelength;
laser diode pumping means, located adjacent to one of said faces and closely coupled to said gain medium, for optically pumping said gain medium; and
resonance means, carried by at least one of said two opposite faces, for forming a highly reflective resonator at said fundamental wavelength and an impedance-matched resonator at a harmonic of said fundamental wavelength, said resonance means having an output at said harmonic which is generally more reflective than transmissive.

11. The micro-laser of claim 10, wherein said gain medium is a crystal which is cut to produce Type-I harmonic generation.

12. The micro-laser of claim 10, wherein said laser diode means produces optical radiation at about 800 nm; wherein said gain medium is NYAB which has a neodymium doping of about 6%; and wherein said resonance means comprises a coating carried by one face of said gain medium for high transmission at about 800 nm.

13. The micro-laser of claim 10, wherein said gain medium has a thickness in the range of 0.01 mm to 0.99 mm and has a concentration of neodymium such that the round trip absorption losses at the wavelength of said harmonic are less than about twenty-five percent.

14. The micro-laser of claim 10, wherein said resonance means produces a phase shift at said two faces in an amount which yields enhanced harmonic conversion.

15. The micro-laser of claim 10, wherein said resonance means comprises:
coating means, carried on one face of said gain medium, for high reflection at said fundamental wavelength and at said harmonic of said fundamental wavelength; and
a plano-convex optical element having a flat face adjacent to the opposite face of said gain medium and having a curved face which carries means for high reflection at said fundamental wavelength and transmission at said harmonic of said fundamental wavelength.

16. The micro-laser of claim 15, further including means for spacing said opposite face of said gain medium from said flat face of said plano-convex optical element.

17. The micro-laser of claim 10, wherein said resonance means comprises:
a coating, carried by both of said faces, for high reflectivity at said fundamental wavelength;
a coating, carried by said one face, for high reflectivity at said harmonic; and
a coating, carried by the other of said two faces and phase matched to said one face, for transmission at said harmonic on the order of about 20 percent or less.

18. The micro-laser of claim 10, further including at least one birefringent crystal which is located adjacent to the other of said faces to receive light at said harmonic of said fundamental wavelength.

19. The micro-laser of claim 10, further including at least one dispersive crystal which is located adjacent to the other of said faces to receive light at said harmonic of said fundamental wavelength.

20. A laser system comprising:
an etalon of a self-doubling gain medium which has two parallel opposite faces;
laser diode source means for pumping said gain medium with optical pumping radiation to produce laser light at a predetermined wavelength and at a harmonic of said predetermined wavelength;
a first reflecting platelet having one face for receiving said optical pumping radiation and having an opposite face which is located adjacent to one face of said etalon, said faces of said etalon being transmissive at said predetermined wavelength, and the opposite face of said etalon being generally more reflective than transmissive at said harmonic wavelength; and
a second reflecting platelet having one face located adjacent to said opposite face of said etalon and having an opposite face which is highly reflective at said predetermined wavelength and which is highly transmissive at said harmonic wavelength.

21. The laser of claim 20, wherein said second platelet is made from a material having a gradient index of refraction.

22. The laser of claim 20, further including coating means for separating said opposite face of said first platelet from said one face of said etalon.

23. The laser of claim 20, further including coating means for separating said opposite face of said etalon from said one face of said second platelet.

24. A laser system, comprising:
a) a source of optically coherent light; and
b) a platelet of a self-doubling gain crystal which when pumped by said source is characterized by lasing at a fundamental wavelength and at harmonic of said fundamental wavelength, and which has two faces of which one of said faces is closely coupled to said source and carries thereon means for transmitting said light from said source to pump said platelet and means for substantially reflecting into said platelet optical radiation at said fundamental wavelength and at a second harmonic of said fundamental wavelength, the other of said two faces carrying means for substantially reflecting into said platelet said optical radiation at said fundamental wavelength and for transmitting out of said platelet light at said harmonic wavelength in an amount to avoid excessive absorption in said gain crystal and to form an impedance matched optical resonator at said harmonic wavelength.

25. The system of claim 24, wherein said self-doubling gain crystal is Nd:YAB.

26. The system of claim 24, wherein said gain crystal is NYAB, said fundamental wavelength is approximately 1060 nm and said harmonic wavelength is approximately 530 nm.

27. The system of claim 26, wherein said one face of said gain crystal carries an optical coating which is transmissive at the wavelength of said source; and wherein said means for transmitting said light from said source into said platelet comprises a optical coating which is highly reflective at approximately 1060 nm and at approximately 530 nm.

28. The system of claim 27, wherein said means for substantially reflecting into said platelet said optical radiation at said fundamental wavelength and for transmitting out of said platelet light at said harmonic wavelength comprises at least one optical coating which is highly reflective at about 1060 nm and about twenty percent or less transmissive at about 530 nm.

29. The system of claim 25 wherein said faces are substantially flat and parallel to each other.

30. The laser of claim 2, wherein said self-doubling crystal is NMLM.

31. The laser of claim 2, wherein said self-doubling crystal is Nd:LaBGeO$_4$.

32. The laser of claim 2, wherein said self-doubling crystal is Cr:KTP.

33. The system of claim 24, wherein said self-doubling gain crystal is Nd:MgO:LiNbO$_3$.

34. The system of claim 24, wherein said self-doubling gain crystal is Tm:LiNbO$_3$.

* * * * *

UNITED STATES PATENT AND TRADEMARK OFFICE
CERTIFICATE OF CORRECTION

PATENT NO. : 5,070,505
DATED : December 3, 1991
INVENTOR(S) : Dixon

It is certified that error appears in the above-identified patent and that said Letters Patent is hereby corrected as shown below:

| Col. | Line | |
|------|------|---|
| 3 | 1-3 | "Further size reductions might be possible if the gain medium were separate elements which were located adjacent to each other." should be deleted. |
| 3 | 6 | "using self-frequency doubling" should read --using a self-frequency doubling-- |
| 4 | 34-35 | "longitudinal mode structure is expressly specified" should read --longitudinal modes of substantially the same frequency or wavelength. Unless the longitudinal mode structure is expressly specified-- |

Signed and Sealed this

Twentieth Day of April, 1993

Attest:

MICHAEL K. KIRK

Attesting Officer

Acting Commissioner of Patents and Trademarks